US009152813B2

(12) United States Patent
Franzki et al.

(10) Patent No.: US 9,152,813 B2
(45) Date of Patent: *Oct. 6, 2015

(54) TRANSPARENT REAL-TIME ACCESS TO ENCRYPTED NON-RELATIONAL DATA

(71) Applicant: International Business Machines Corporation, Armonk, NY (US)

(72) Inventors: Ingo Franzki, Schoenaich (DE); Joerg Schmidbauer, Boblingen (DE)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/148,936

(22) Filed: Jan. 7, 2014

(65) Prior Publication Data
US 2014/0129832 A1 May 8, 2014

Related U.S. Application Data

(63) Continuation of application No. 13/417,774, filed on Mar. 12, 2012.

(51) Int. Cl.
G06F 21/62 (2013.01)
G06F 21/60 (2013.01)

(52) U.S. Cl.
CPC .......... *G06F 21/6209* (2013.01); *G06F 21/602* (2013.01); *G06F 21/6218* (2013.01)

(58) Field of Classification Search
None
See application file for complete search history.

(56) References Cited

U.S. PATENT DOCUMENTS

| 6,259,789 | B1* | 7/2001 | Paone | 380/28 |
| 7,694,133 | B2* | 4/2010 | Sibert | 713/164 |
| 7,885,405 | B1* | 2/2011 | Bong | 380/37 |
| 8,594,789 | B2* | 11/2013 | Goode, Jr. | 607/17 |
| 2005/0053232 | A1* | 3/2005 | Bace | 380/29 |
| 2006/0277413 | A1* | 12/2006 | Drews | 713/189 |
| 2008/0310624 | A1* | 12/2008 | Celikkan et al. | 380/29 |
| 2009/0214024 | A1* | 8/2009 | Schneider | 380/28 |
| 2009/0240956 | A1 | 9/2009 | Metzger et al. | |
| 2010/0074441 | A1* | 3/2010 | Pauker et al. | 380/45 |
| 2011/0103579 | A1* | 5/2011 | Martin et al. | 380/28 |
| 2014/0108813 | A1* | 4/2014 | Pauker et al. | 713/189 |

FOREIGN PATENT DOCUMENTS

EP 2051183 A1 4/2009
WO 2007138599 A3 12/2007

OTHER PUBLICATIONS

U.S. Appl. No. 13/417,774 entitled "Transparent Real-Time Access to Encrypted Non-Relational Data", filed Mar. 12, 2012.

* cited by examiner

*Primary Examiner* — Robert Beausoliel, Jr.
*Assistant Examiner* — Susan F Rayyan
(74) *Attorney, Agent, or Firm* — Noah A. Sharkan

(57) ABSTRACT

Embodiments include a computer system, method and program product for encrypted file access. An access program module, connected to at least one file system, intercepts a data request for accessing a plaintext file with information stored physically and consecutively on a hard disk and having a pre-determined order and length expected by a program that sends the data request, wherein the plaintext file includes a plaintext record having a key field and a plaintext data field. The access program module determines an encrypted file, associated with the plaintext file, based on a configuration file and the data request, wherein the configuration file indicates the encrypted file associated with the plaintext file. The access program module determines one or more encryption keys based on the configuration file. The access program module accesses an encrypted data field within the encrypted file based on the encryption keys and the key field.

9 Claims, 3 Drawing Sheets

TRANSPARENT REAL-TIME ACCESS TO ENCRYPTED NON-RELATIONAL DATA

CROSS REFERENCE TO RELATED APPLICATION

This application is a continuation of U.S. patent application Ser. No. 13/417,774 filed Mar. 12, 2012 the entire content and disclosure of which is incorporated herein by reference.

BACKGROUND

1. Field of the Invention

The present invention relates generally to data encryption, and more particularly to a system, method, and program product for transparent real-time access to encrypted non-relational data.

2. Description of the Related Art

Organizations, such as banks and large companies, often engage in high-volume electronic transactions involving the transmission, access, and storage of sensitive information that has a specific order and is of a specific length (i.e., non-relational data) over a computer network. The sensitive information may include bank account information, credit card information, and social security numbers. In addition, certain employees of the organizations may have access to the sensitive information. In order to protect the sensitive information from unauthorized use and to stay in compliance with government data security laws, data encryption is utilized to transform the sensitive information into encrypted data.

Data encryption is a method of converting readable data (plaintext) into unreadable characters (ciphertext), which can prevent unauthorized access and use of the sensitive information. Ciphertext, also called encrypted data or scrambled data, can be stored on a computer readable tangible storage device, such as a hard disk, or transmitted over a network, for example, via an e-mail message by a sender to a recipient. Additionally, numerous existing application programs of an organization, which may have been used for many years and that handle the sensitive information in plaintext form, may require updating so that the application programs can access an encrypted version of the sensitive information.

Currently, in order to update the organization's application programs that handle the sensitive information, the application programs may need to be programmatically customized so that the application programs are capable of accessing encrypted data. However, programmatically customizing the application programs so that they are capable of accessing encrypted data can be very costly and time consuming for organizations that have a large number of application programs. Moreover, oftentimes source code of the application programs is not readily available for organizations wanting to programmatically customize the application programs. Even after the source code is found numerous programmatic customizations in multiple places of the source code may be required, as well as programmatic customizations to other computer systems that the application programs communicate with.

SUMMARY

In one embodiment of the invention, a method is disclosed for encrypted file access. The method comprises an access program module, connected to at least one file system, intercepting a data request for accessing a plaintext file with information stored physically and consecutively on a hard disk and having a pre-determined order and length expected by a program that sends the data request, wherein the plaintext file includes a plaintext record having a key field and a plaintext data field. The method further comprises the access program module determining an encrypted file, associated with the plaintext file, based on a configuration file and the data request, wherein the configuration file indicates the encrypted file associated with the plaintext file and the encrypted file includes an encrypted record associated with the plaintext record, and wherein the encrypted record includes a header field, the key field, and an encrypted data field that is associated with the plaintext data field. The method further comprises the access program module determining one or more encryption keys based on the configuration file. The method further comprises the access program module accessing the encrypted data field based on the one or more encryption keys and the key field.

In another embodiment of the invention, a computer program product is disclosed for encrypted file access. The computer program product comprises a computer readable storage medium and program instructions stored on the computer readable storage medium. The program instructions comprise program instructions, for an access program module connected to at least one file system, to intercept a data request for accessing a plaintext file with information stored physically and consecutively on a hard disk and having a pre-determined order and length expected by a program that sends the data request, wherein the plaintext file includes a plaintext record having a key field and a plaintext data field. The program instructions further comprise program instructions to determine an encrypted file, associated with the plaintext file, based on a configuration file and the data request, wherein the configuration file indicates the encrypted file associated with the plaintext file and the encrypted file includes an encrypted record associated with the plaintext record, and wherein the encrypted record includes a header field, the key field, and an encrypted data field that is associated with the plaintext data field. The program instructions further comprise program instructions to determine one or more encryption keys based on the configuration file. The program instructions further comprise program instructions to access the encrypted data field based on the one or more encryption keys and the key field.

In another embodiment of the invention, a computer system is disclosed for encrypted file access. The computer system comprises one or more processors, one or more computer readable memories, one or more computer readable storage media, and program instructions stored on the one or more storage media for execution by the one or more processors via the one or more memories. The program instructions comprise program instructions, for an access program module connected to at least one file system, to intercept a data request for accessing a plaintext file with information stored physically and consecutively on a hard disk and having a pre-determined order and length expected by a program that sends the data request, wherein the plaintext file includes a plaintext record having a key field and a plaintext data field. The program instructions further comprise program instructions to determine an encrypted file, associated with the plaintext file, based on a configuration file and the data request, wherein the configuration file indicates the encrypted file associated with the plaintext file and the encrypted file includes an encrypted record associated with the plaintext record, and wherein the encrypted record includes a header field, the key field, and an encrypted data field that is associated with the plaintext data field. The program instructions further comprise program instructions to determine one or more encryption keys based on the configuration file. The program instructions further comprise program instructions to access the encrypted data field based on the one or more encryption keys and the key field.

BRIEF DESCRIPTION OF THE SEVERAL
VIEWS OF THE DRAWINGS

DETAILED DESCRIPTION

Figure 1:
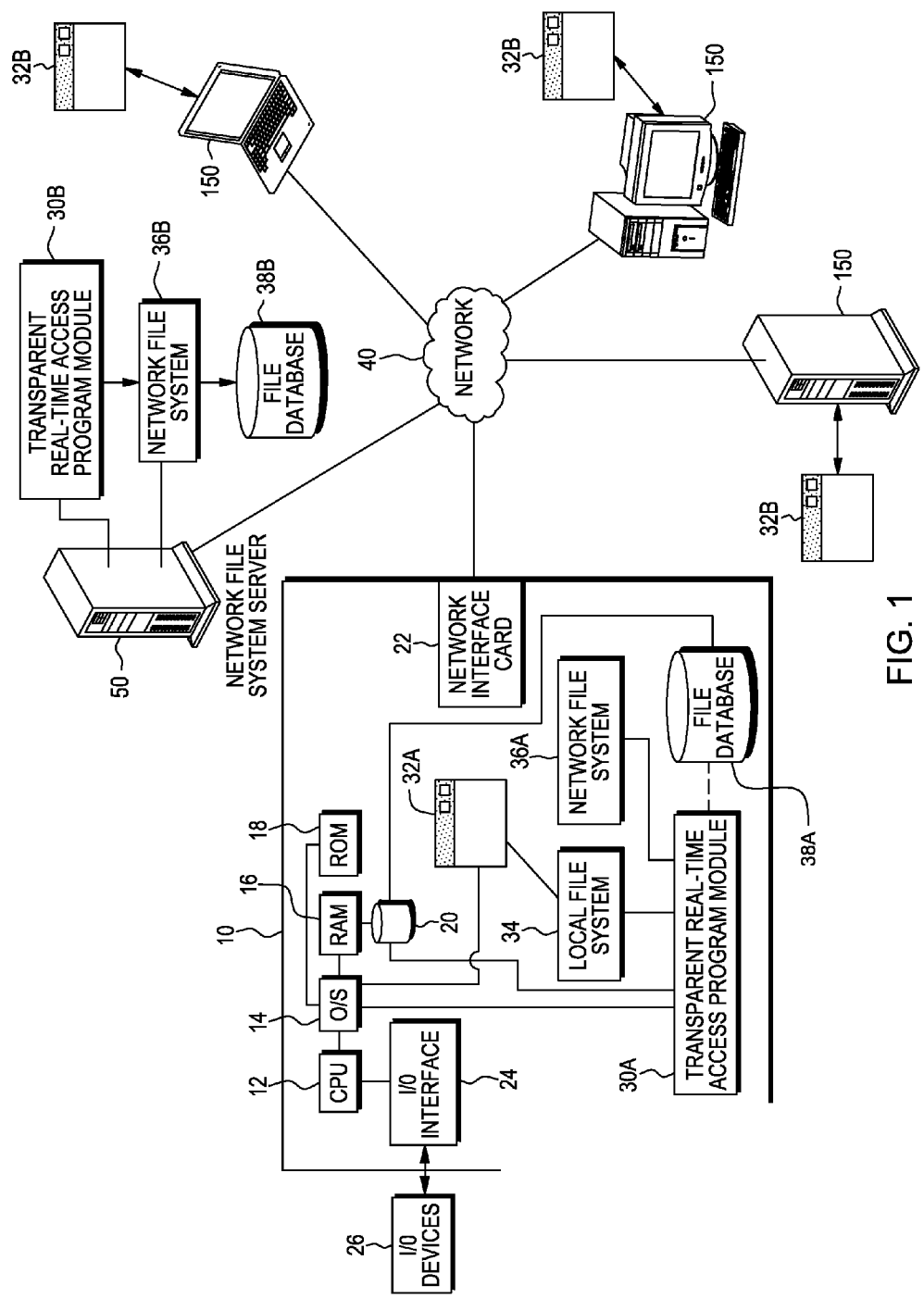
FIG. 1 is a block diagram of a computer system utilizing a transparent real-time access program module according to an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

In addition, it will be understood that when an element as a program module, program, or hardware component is referred to as being "connected", "operatively connected", "coupled" or "operatively coupled" to another element, it can be directly connected or directly coupled to the other element, or intervening elements may be present. In contrast, when an element is referred to as being "directly connected" or "directly coupled" to another element, there are no intervening elements present.

Exemplary embodiments now will be described more fully herein with reference to the accompanying drawings. This disclosure may, however, be embodied in many different forms and should not be construed as limited to the exemplary embodiments set forth herein. Rather, these exemplary embodiments are provided so that this disclosure will be thorough and complete, and will fully convey the scope of this disclosure to those skilled in the art. In the description, details of well-known features and techniques may be omitted to avoid unnecessarily obscuring the presented embodiments.

Embodiments of the present invention provide a technique for enabling an application program to access encrypted non-relational data utilizing block ciphers at a record field level, and in real-time without having to programmatically customize the application program.

Historically, large amounts of sensitive information was stored on computers in plaintext and in a record based, non-relational file format in which it was assumed that the computers were secure from external threats and the physical security around the computers, such as security guards and badge access, was sufficient to protect the sensitive information from unauthorized access. However, with the rise of cybercrime and the increased interconnectivity between computer systems, via computer networks, a person can circumvent cybersecurity built to protect the computers systems and obtain unauthorized access to the sensitive information through the Internet. Over a period of time, government regulations, business policies, customer perception, and end-user needs have changed requiring increased data security of the sensitive information wherein storing the sensitive information in plaintext is no longer acceptable. Nevertheless, many of the application programs that access and make use of the sensitive information are legacy applications that were designed many years ago for accessing the sensitive information in plaintext and not as encrypted non-relational data. Thus, in one embodiment of the disclosure there is a need to encrypt the sensitive information stored in plaintext, such that the sensitive information is stored as encrypted non-relational data, and remove the plaintext version in a manner that does not cause the application programs to enter into an error condition (i.e., throw an exception). The challenge is that many of the application programs were not designed to access encrypted non-relational data, and the application programs are so old that the source code is often unavailable. Thus, customizing the application programs to access encrypted non-relational data can be expensive and difficult. Accordingly, in the present disclosure a technique for enabling an application program to access the encrypted non-relational data is described.

Non-relational data is information that is stored using a pre-determined order and length that is expected by an application program. For example, the non-relational data may include a name field having a length of 20 bytes followed by an address field having a length of 25 bytes. Non-relational data includes freeform plaintext within a document, such as a text file, in which the freeform plaintext can include information such as personal addresses, dates, social security numbers, credit card numbers, and other sensitive or non-sensitive information. Thus, if the order and/or length of the information changes, for example, due to new data security policies requiring encryption utilizing block ciphers, then the application program expecting the information may no longer be able to access the data because the encrypted version of the information deviates from the original order and length. However, the present disclosure provides an access program module that in one embodiment encrypts the original non-relational data and puts the non-relational data into an encrypted file copy, wherein the encrypted file copy is a new file stored in a database that contains the original non-relational data in encrypted form. If the application program needs to read the non-relational data from the encrypted file copy then the access program module can decrypt the non-relational data in the encrypted file copy and provide the non-relational data in unencrypted form to the application program in a format that the application program expects. Conversely, if the application program needs to write non-relational data to the encrypted file copy then the access program module can encrypt the non-relational data from the application program and write the non-relational data in encrypted form to the encrypted file copy that is stored in the database. Thus, the access program module provides increased data security and allows continued use of unmodified application programs. Specifically, the access program module allows an application program (e.g., a legacy application), in real-time without being programmatically customized, to continue to utilize non-relational data even if the pre-determined order and/or length of the non-relational data changes as a result of encryption that is performed utilizing block ciphers.

Block ciphers are algorithms utilized to encrypt/decrypt a fixed length of bits of non-relational data, wherein the length is typically 8-bytes to 16-bytes, but other lengths are possible. A block cipher always yields encrypted text that is a multiple of block size regardless of input length. For example, an 8-byte block cipher transforms 8-bytes of plaintext to a corresponding 8-bytes of ciphertext, but a 16-byte block cipher would transform the same 8-bytes of plaintext to a corresponding 16-bytes of ciphertext. Thus, the length of the plaintext in encrypted form (i.e., number of bytes of the ciphertext) is a multiple of the cipher block length. The most commonly utilized ciphers for performing encryption or decryption are block ciphers, which include the Data Encryption Standard (DES) adopted by the National Bureau of Standards (NBS), triple DES a variant of DES, and Advanced Encryption Standard (AES) published by the National Institute of Standards and Technology (NIST).

Moreover, as used herein, real-time refers to timeliness of transmission, access, and storage of encrypted non-relational data, wherein an application program accesses parts of an encrypted file copy (e.g., records and data fields within the records) when needed. The timeliness is defined based on end-user requirements wherein the transmission, access, and/or storage of the encrypted non-relational data by the application program occurs at least more frequently than on a daily basis. In one embodiment, in contrast to batch based techniques, the encrypted file copy resides on a hard disk of a computer hardware system that is running an operating system such as z/VSE (Virtual Storage Extended), and is accessed as needed instead of on a fixed schedule. The encrypted non-relational data can be in a record based, non-relational file format, for example IBM's Virtual Storage Access Method file format (VSAM file format) or in a record based file format similar to the VSAM file format.

Several software program modules, tools, techniques and solutions for encrypting and accessing non-relational data are currently utilized, wherein the non-relational data reside on computer hardware systems having a record based file-system and file format (i.e., VSAM file format) compatible with an operating system such as z/VSE. For example, a currently utilized software program module for encrypting non-relational data involves utilizing system provided encryption and decryption software program solutions, compatible with z/OS® developed by IBM®, and cryptographic hardware to encrypt data for data exchange, data archive, and data backup purposes. However, the currently utilized system provided encryption and decryption software program solutions and cryptographic hardware implement batch oriented processes that work on a complete data set or file and run less frequently than on a daily basis, wherein all data of the data set or file is encrypted including all record fields in order to provide increased data security.

The batch oriented processes do not provide real-time access to individual records, but instead run on a daily, weekly, monthly, or yearly basis. Furthermore, batch oriented processes refer to unattended processing of complete files as opposed to real-time processing wherein real-time processing is interactive and involves an application program timely transmitting, accessing, and/or storing sensitive information that are parts of a file (e.g., records) when needed. The timeliness of real-time processing is defined based on end-user requirements wherein the transmission, access, and/or storage of the non-relational data occurs at least more frequently than on a daily basis.

Accordingly, current software program modules for accessing encrypted non-relational data that is in a non-relational format such as the VSAM file format or a file format similar to the VSAM do not provide an effective method for transparent real-time access to the encrypted non-relational data, because the current software program modules either are batch oriented (i.e., not real-time) or require the application program to be programmatically customized in order to access the encrypted non-relational data. Transparent real-time access to encrypted non-relational data is non-batch oriented and refers to an application program having electronic access to encrypted non-relational data at a record field level, in real-time, and without having to programmatically customize the application program. Thus, there exists a challenge of providing a software program module that enables an application program to have transparent real-time access to encrypted non-relational data. To address the challenge, a computer system, method, and program product for enabling an application program to access encrypted non-relational data are disclosed.

FIG. 1 illustrates a computer system that includes computer 10 having transparent real-time access program module 30A compiled and running. Computer 10 includes CPU 12, operating system (O/S) 14, RAM 16, ROM 18, storage 20, I/O interface 24, network interface card 22, access program module 30A, application program 32A, local file system 34, network file system 36A, and file database 38A. In one embodiment, file database 38A represents a particular database on storage 20, wherein storage 20 is a hard disk. Moreover, computer 10 communicates with I/O devices 26 through an I/O interface 24. I/O interface 24, which is operatively connected to CPU 12, includes any system for exchanging information to or from an external device. I/O devices 26 include any known type of external device such as a display device (e.g., monitor), keyboard, mouse, printer, or handheld device. In addition, local file system 34 is associated with storage 20.

Computer 10 is connected to network file system server 50 and computers 150 through network interface card 22 and network 40 wherein computer 10 and computers 150 are electronic devices that include laptops, desktops, servers, and mainframes. Although not shown for simplicity, network file system server 50 and computers 150 each include a CPU, operating system, memory, storage, I/O interface, and a network interface card. Each of computers 150 can have an application program 32B installed and running.

Access program module 30A, of computer 10, communicates with O/S 14, and access program module 30A enables application program 32A and/or 32B to access encrypted non-relational data in file database 38A. In one embodiment, access program module 30A uses block ciphers and accesses data at a record field level in real-time (i.e., with minimal latency, wherein access to encrypted non-relational data occurs at least more frequently than on a daily basis). Specifically, access program module 30A is operatively connected to local file system 34 and network file system 36A, wherein access program module 30A can intercept a data request from application program 32A in response to local file system 34 communicating to access program module 30A an occurrence of a predetermined condition that can include, but is not limited to, the data request being a file open request, a file read request, a file write request, or a file close request. Access program module 30A can also intercept a data request from application program 32B in response to network file system 36A communicating to access program module 30A an occurrence of a predetermined condition that can include, but is not limited to, the data request being a file open request, a file read request, a file write request, or a file close request. Moreover, access program module 30A is connected to file database 38A and communicates with O/S 14 in order to access encrypted non-relational data in file database 38A, wherein file database 38A is physically on storage 20.

In the disclosed embodiment, access program module 30A handles non-relational data encrypted with block ciphers, because non-relational data has a pre-determined order and fixed length of bits that are expected by application programs 32A and 32B. Block ciphers are symmetric key algorithms that are utilized to operate on a fixed length of data called a block, and in the present embodiment the block includes plaintext non-relational data that are to be transformed into a block of encrypted non-relational data utilizing a secret key to determine the transformation. The length of the encrypted non-relational data will be a multiple of the cipher block length. In the preferred embodiment, block ciphers are utilized instead of streaming ciphers, because block ciphers can provide better encryption strength. However, if streaming ciphers are utilized then the length of bits of the encrypted non-relational data will not become longer, but if application 32A and/or 32B are performing a read request then the encrypted non-relational data would still need to be decrypted in order for application 32A and/or 32B to use the non-relational data.

In the disclosed embodiment, access program module 30A allows application program 32A and/or 32B, which may be a legacy application program, that expects plaintext data to be at a particular location in a file, to access an encrypted version of that plaintext data in another file at a different location. Many existing program applications store non-relational data as a continuous block of data in a single file. The existing program applications may use offsets into that block of data to access a desired field of a desired record. For example, an application program may store a plurality of 35-byte records in the file in which each record has a 10-byte name field, followed by a 5-byte account number field, and followed by a 20-byte address field. The application program could then quickly access the account number field by skipping the first 10 bytes (the name field) and reading the $11^{th}$-$15^{th}$ bytes (the account number field) to get the account number. Assuming a zero based counting system (i.e., where the first record is record number 0), the application program can access the account number of an nth record by simply reading 5 bytes starting at byte n*35+10 (i.e., each record is 35 bytes long, so the nth record is n*35 bytes into the file, plus 10 bytes to skip over the name field). Similarly, operations of n*35 that get the nth name field, and n*35+15 that get the nth address field, may be used. When a file structured in this way is encrypted using a block cipher, these assumptions about location of fields within each record are broken, because the block encryption algorithm will convert data fields to a size that is a multiple of the cipher block length when the block cipher is applied to each data field. For example, in one embodiment, if the 10-byte name field were encrypted using a 16-byte cipher block length, the result would be that the name field now occupies 16 bytes. Likewise, if the 20-byte address field were encrypted using a 16-byte cipher block length, the result would be that the address field now occupies 32 bytes. Thus, in one embodiment, an encrypted file copy of an original plaintext file is generated and access program module 30A accesses the encrypted file copy in response to a data request sent by application program 32A and returns a result that application program 32A expects, even though the information is being retrieved from an encrypted version of the original plaintext file instead of the original plaintext file. In general, module 30A provides the information by intercepting and handling a data request sent by application program 32A for access to non-relational data that was in the original plaintext file.

Moreover, record field level refers to data fields within a data record (e.g., bank account data record), wherein the data record may, for example, include a customer's name, an address, a customer number, and/or a credit card number. Thus, access program module 30A can communicate directly with local file system 34 and network file system 36A to intercept a data request, and to provide application program 32A and/or 32B access to encrypted non-relational data at the record field level wherein the encrypted non-relational data are stored in file database 38A. Specifically, the data request is intercepted by access program module 30A utilizing functionality provided by O/S 14. The functionality provided by O/S 14 allows access program module 30A to execute in response to local file system 34 and/or network file system 36A calling access program module 30A based on an occurrence of a predetermined condition (i.e., the condition includes, but is not limited to, a data request being a file open request, a file read request, a file write request, or a file close request), whereupon access program module 30A determines whether to obtain control over the data request.

As described above, access program module 30A communicates with local file system 34 and network file system 36A. Specifically, local file system 34 provides application 32A local access to encrypted non-relational data via access program module 30A, wherein the encrypted non-relational data are stored in file database 38A. However, network file system 36A provides application 32B remote access to encrypted non-relational data via access program module 30A, wherein the encrypted non-relational data are stored in file database 38A.

In addition, network file system server 50 includes transparent real-time access program module 30B, network file system 36B, and file database 38B wherein network file system server 50 communicates with computers 10 and 150 through network 40 to provide application 32A and/or 32B remote access to encrypted non-relational data. Specifically, access program module 30B can communicate directly with network file system 36B to intercept a data request, and to provide application program 32A and/or 32B remote access to encrypted non-relational data at the record field level wherein the encrypted non-relational data are stored in file database 38B. The data request is intercepted by access program module 30B utilizing functionality provided by the operating system installed on network file system server 50.

The functionality provided by the operating system allows access program module 30B to execute in response to network file system 36B calling access program module 30B based on an occurrence of a predetermined condition (i.e., the condition includes, but not limited to, a file open request, a file read request, a file write request, or a file close request), whereupon access program module 30B determines whether to obtain control over the data request. Thus, access program module 30B enables application program 32A and/or 32B to access encrypted non-relational data utilizing block ciphers at a record field level and in real-time without having to programmatically customize application program 32A or 32B.

Furthermore, local file system 34 and network file system 36A logically organize information as a hierarchical structure of directories and files in file database 38A, wherein each of the files in file database 38A can store data. Also, network file system 36B organizes information as a hierarchical structure of directories and files in file database 38B, wherein each of the files in file database 38B can also store data. In one embodiment, the directories of local file system 34, network file system 36A, and network file system 36B can be implemented as a formatted file that includes information about other files and directories.

In the present embodiment, network 40 provides data connectivity between computer 10, network file system server 50, and computers 150 according to a client/server model of information delivery. However, in other embodiments computer 10 and 150 may not have network access since the present disclosure operates to improve data security of non-relational data stored on a computer readable tangible storage device even if the storage device is not connected to network 40.

Figure 2:
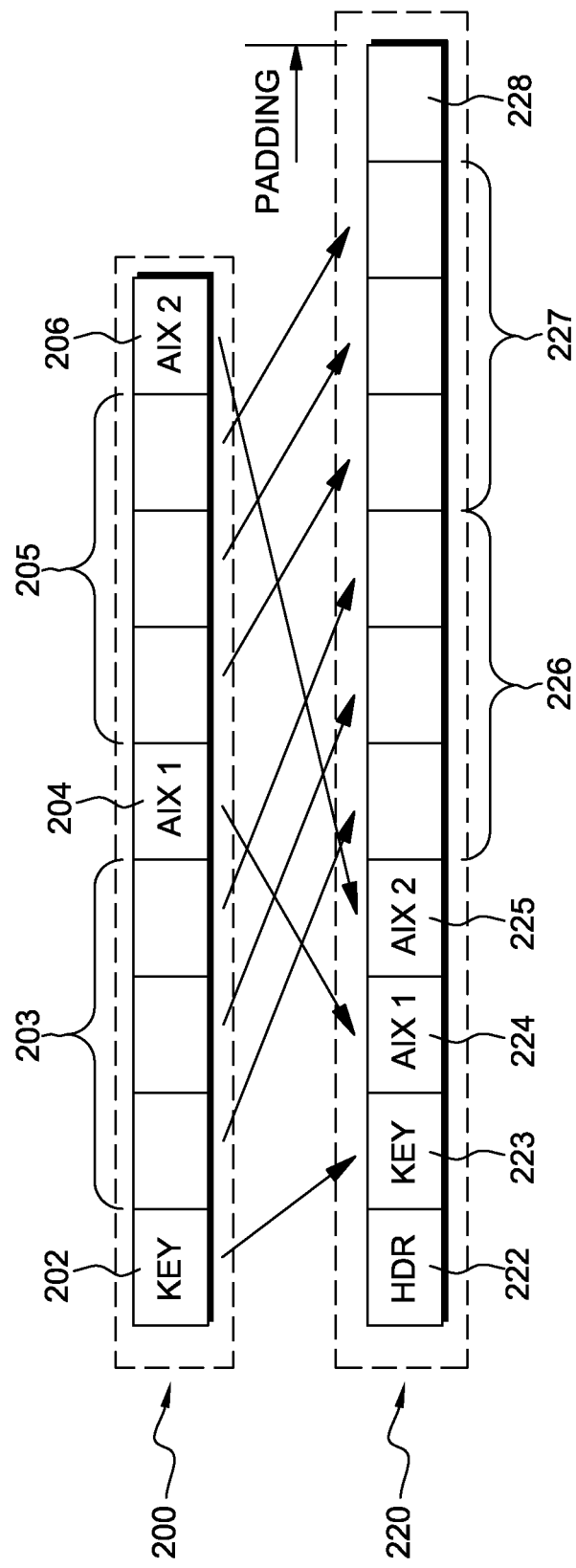
FIG. 2 is a diagram illustrating access program module transforming record fields of an original plaintext file having a first format, to record fields of an encrypted file copy having a second format according to an embodiment of the present invention.

FIG. 2 is a diagram illustrating access program module 30A performing a transformation of record fields of an original plaintext file having a first format to record fields of an encrypted file copy having a second format in order to provide increased data security. In the disclosed embodiment, a copy of the original plaintext file is made and encrypted, and the copy is accessible via application program 32A and/or 32B. The disclosed embodiment addresses a common situation where application program 32A and/or 32B can neither be modified to access record fields of a different size from what application program 32A and/or 32B were originally written to handle, nor be modified to access a file or files other than what application program 32A and/or 32B were originally written to handle. In alternative embodiments, an encrypted version of an original plaintext file may be made in place of the original plaintext file.

As mentioned above, access program module 30A can transform the record fields of the original plaintext file having the first format to the record fields of the encrypted file copy having the second format, wherein the record fields are organized sequentially (i.e., in a non-relational file format).

Although the transformation is described in context of access program module 30A, the same transformation can be performed by access program module 30B. The encrypted file copy having the second format is needed, because utilizing block ciphers to encrypt non-relational data changes the length of encrypted data fields that application program 32A and/or 32B expect to handle when sending a data request. For example, if a plaintext data field of the original plaintext file that contained non-relational data has a length of 100 bits and the block length of the cipher is 128 bits, then the corresponding encrypted data field of the encrypted file copy will be 128 bits (i.e., a multiple of the cipher block length). Thus, the encryption performed by access program module 30A increases data security of non-relational data that is stored on a hard disk, but application program 32A and/or 32B will not be able to read the encrypted data field containing the non-relational data unless the data field is transformed back into the first format that is expected by application program 32A and/or 32B.

Non-relational data is information having a pre-determined order and length that is expected by an application program. As a result, in order for application 32A and/or 32B to utilize the encrypted data within the data fields of the encrypted file copy, then access program module 30A needs to transform the data back into the first format as expected by application 32A and/or 32B. For example, using the 35-byte record previously described, application 32A may assume that the account number field begins at the $11^{th}$ byte of a record. However, since the 35-byte record has been encrypted the account number field may now begin at the $17^{th}$ byte (assuming the 10-byte name field has become 16 bytes long after having a 16-byte block cipher applied to it) and is now 16 bytes long (again, assuming the 5-byte account number field has been encrypted with a 16-byte block cipher and is now 16 bytes long). When application program 32A sends a data request to access the account number field at the $11^{th}$ byte of the nth record in the original plaintext file, access program module 30A will intercept the data request, access 16 bytes starting at the $17^{th}$ byte of the nth record, decrypt that record field, and return the original plaintext information to application 32A.

A system programmer/administrator creates a configuration file that resides on a hard disk, for example storage 20 on computer 10, that is readily accessible by access program module 30A. The configuration file is needed because it contains configuration information needed for access program module 30A to open the encrypted file copy, and provide access to encrypted non-relational data in response to a data request sent by application program 32A and/or 32B. However, part of the configuration information in the configuration file, for example configuration information about the first format of the original plaintext file, may be generated automatically by access program module 30A by parsing source code of application program 32A and/or 32B if the source code is available.

In the present embodiment, the encrypted file copy having the second format is created by utilizing the first format of the original plaintext file together with rules corresponding to the chosen encryption algorithm. Once the encrypted file copy is created for the first time, plaintext non-relational data (e.g., unencrypted sensitive information) within the original plaintext file is removed and the original plaintext file may remain for purposes of preventing application program 32A and/or 32B from entering into an error condition (i.e., throwing an exception) due to being unable to find the original plaintext file.

Rules corresponding to the chosen encryption algorithm are provided in configuration information of the configuration file and the rules govern the transformation of the record fields between the first format and the second format. Specifically, the rules corresponding to the chosen encryption algorithm determine the cipher block length for access program module 30A to utilize for transforming record fields of the original plaintext file to record fields of the encrypted file copy. The rules also determine the transformation (i.e., re-ordering) of the record fields of the original plaintext file having the first format to the record fields of the encrypted file copy having the second format. In addition, as part of the configuration information, the configuration file includes: a list containing files configured for encryption, encryption keys that are needed, record fields within the original plaintext file to encrypt, an encryption algorithm for access program module 30A to utilize for transforming the record fields of the original plaintext file having the first format to record fields of the encrypted file copy having the second format, and the location of encrypted non-relational data within the encrypted file copy.

Record 200 represents a record of the original plaintext file having the first format, and record 220 represents a transformation of record 200 to the second format in the encrypted file copy. In the present embodiment, the first format requires the record fields to be in the following sequential order: primary key field 202, data fields 203, first alternate index/key (first AIX) field 204, data fields 205, second alternate index/key (second AIX) field 206. The content within key field 202, first AIX field 204, and second AIX field 206 is generated by the legacy application program (e.g., application program 32A or 32B), but the programmer/administrator determines the size and location of key field 202, first AIX field 204, and second AIX field 206 in the original plaintext file. Each of the fields 202, 203, 204, 205, and 206 are of known, predetermined lengths. In the present embodiment, the first format requires the record fields to be in a specified sequential order as described above. In other embodiments, the first format may require the record fields to be in a different order, wherein the first format is determined by application program 32A and/or 32B.

Moreover, the primary and alternate index/key fields are unencrypted record fields that may be utilized to locate a record within the encrypted file copy in order to respond to a read request or a write request of application program 32A and/or 32B. More than one alternate index/key field may be utilized depending on the configuration of the original plaintext file that corresponds to the encrypted file copy. Thus, the original plaintext file may have included one or more alternate index/key fields or no alternate index/key fields. However, in the present embodiment, the original plaintext file included two alternate index/key fields. Specifically, first AIX field 204 and second AIX field 206 are both alternate index/key fields, wherein key field 202 is a primary encryption key field. Data fields 203 and 205 can include sensitive information such as social security or credit card numbers. Utilizing the first format of the original plaintext file together with rules corresponding to the chosen encryption algorithm, access program module 30A transforms key field 202, first AIX field 204, and second AIX field 206 of record 200 to key field copy 223, first AIX field copy 224, and second AIX field copy 225 of record 220 respectively. Moreover, data fields 203 and 205 are transformed to data fields copy 226 and 227 respectively by access program module 30A. Data fields 226 and 227 are encrypted sensitive information that can include social security and/or credit card numbers, and field length of data fields 203 and 205 must be a multiple of the cipher block length after the transformation is performed by access program module 30A. Thus, pad field 228 is utilized to pad encrypted data fields copy 226 and 227 to a multiple of the cipher block length, if the transformation did not result in the field length of data fields copy 226 and 227 being a multiple of the cipher block length. Block based encryption algorithms require that data that is being encrypted is a multiple of the cipher block length (e.g., DES and triple DES utilize an 8-byte block length, whereas AES utilizes a 16-byte block length).

Moreover, in the present embodiment, the rules governing the transformation require that the record fields of record 220 be in the second format, wherein the sequential ordering of the record fields is as follows: HDR 222, key field copy 223, first AIX field copy 224, second AIX field copy 225, data fields copy 226 and 227, and pad field 228. HDR 222 is a header field created by access program module 30A. HDR 222 may be utilized for storing additional information about record 220 in order to provide a correct transformation between the first format and second format, for example HDR 222 may store the length of record 220 if record 220 has a variable length or store the length of original record 200 from the original plaintext file. HDR 222, key field copy 223, first AIX field copy 224, and second AIX field copy 225 are all fields which remain unencrypted, because the fields are configured to not be encrypted by a system programmer/administrator.

Hence, in general, for each record in the encrypted file copy, a header field is first followed by a primary key field that is unencrypted, one or more alternate index/key fields that are unencrypted, and one or more data fields that may contain encrypted sensitive information. Moreover, the data fields may be followed by a pad field to make the length of the combined data fields, which are encrypted, a multiple of the cipher block length.

Figure 3:
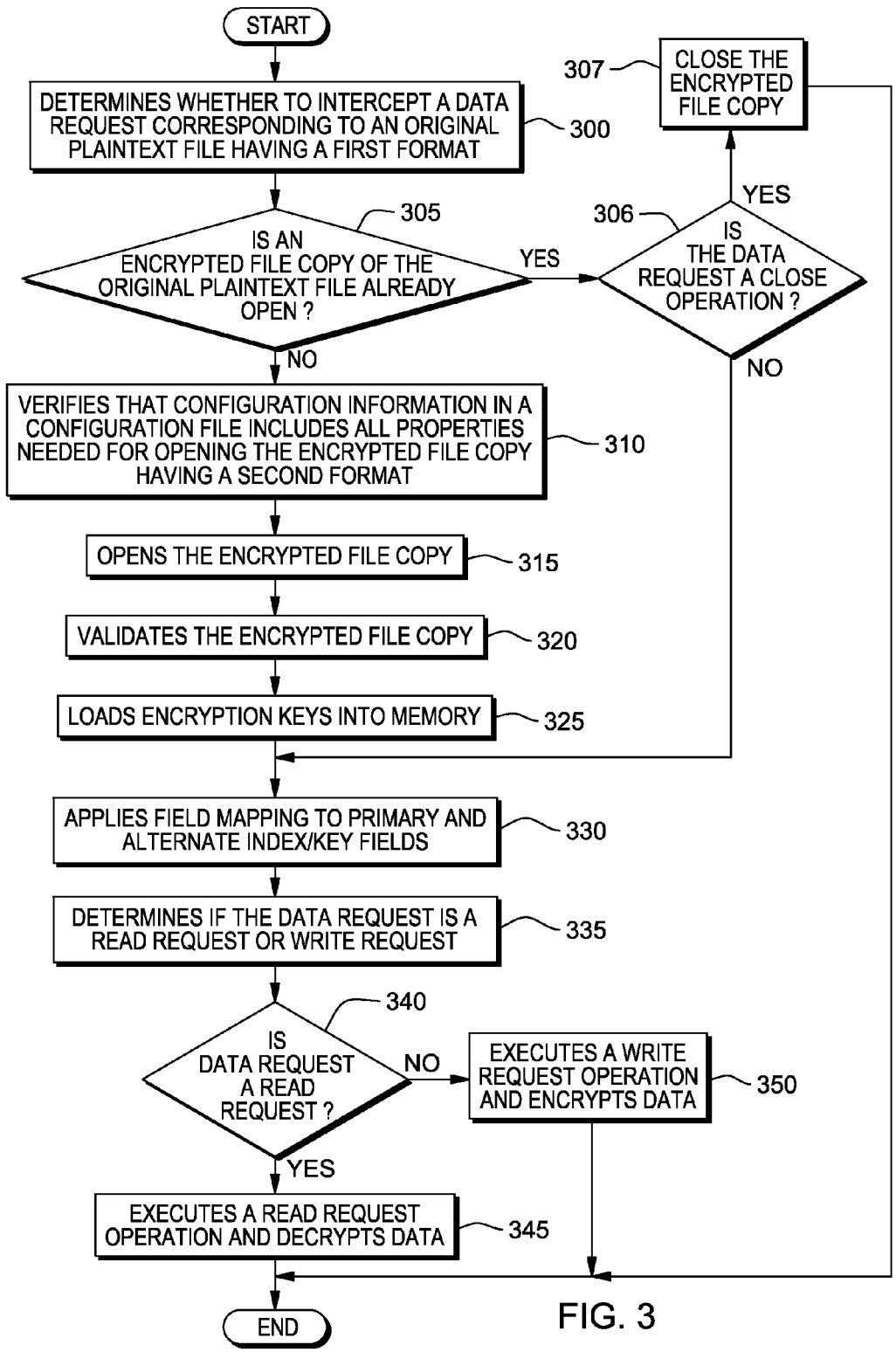
FIG. 3 is a flowchart illustrating operations of the access program module communicating with an operating system installed on a computer, intercepting a data request for the original plaintext file having the first format, and executing an open request, read request, write request, and/or a close request on the encrypted file copy according to an embodiment of the present invention.

FIG. 3 is a flowchart illustrating operations of access program module 30A or 30B handling a data request in order to perform an open operation, a read operation, a write operation, or a close operation. In the present embodiment, access program module 30A is handling data requests, wherein application program 32B is sending one or more data requests to computer 10. Specifically, access program module 30A communicates with network file system 36A and determines whether to intercept a data request corresponding to an original plaintext file having a first format (block 300), wherein the data request is sent by application program 32B to computer 10. Access program module 30A determines whether to intercept the data request based on an occurrence of a predetermined condition that can include, but is not limited to, the data request being a file open request, a file read request, a file write request, or a file close request. If access program module 30A does not intercept the data request then access program module 30A ends and no further processing of the data request is performed by access program module 30A.

However, if access program module 30A intercepts the data request, then access program module 30A determines whether the original plaintext file, corresponding to the data request, is configured for encryption. Access program module 30A can determine if the original plaintext file is configured for encryption by performing a lookup/check against the list containing files configured for encryption, wherein the list is in the configuration file.

If the result of the lookup/check against the list indicates that the original plaintext file is not configured for encryption then access program module 30A cancels execution. Moreover, processing of the data request by access program module 30A ends because the original plaintext file not being configured for encryption indicates that access program module 30A does not need to be utilized for providing application program 32B access to encrypted non-relational data. Otherwise, if the result of the lookup/check against the list indicates that the original plaintext file is configured for encryption, then access program module 30A determines whether an encrypted file copy of the original plaintext file is already open.

If the encrypted file copy of the original plaintext file is already open (the "yes" branch of decision block 305), then access program module 30A determines whether to close the encrypted file copy. If the data request is a close request (the "yes" branch of decision block 306), then access program module 30A performs the close operation to close the encrypted file copy after application program 32B has finished working with the encrypted file copy (block 307). The close operation frees up resources (e.g., the encryption keys and the encrypted file copy) that are utilized to access record content of the encrypted file copy at the record field level. After closing the encrypted file copy, processing of the data request by access program module 30A ends. However, if the data request is not a close operation (the "no" branch of decision block 306), then access program module 30A applies field mapping to primary and alternate index/key fields (block 330).

Applying field mapping to the primary and alternate index/key fields involves transforming the primary and alternate index/key fields of a record corresponding to the original plaintext file having the first format, to primary and alternate index/key fields of a record within the encrypted file copy having the second format. This transformation is governed by rules, described above in FIG. 2, provided in the configuration file. Access program module 30A applies field mapping to primary and alternate index/key fields so that the primary and alternate index/key fields are available to access program module 30A to locate a record in the encrypted file copy in response to a read request or a write request sent by application program 32B. Specifically, in order to position within the encrypted file copy, primary and alternate index/key fields of the original plaintext file having the first format are transformed to primary and alternate index/key fields of the encrypted file copy having the second format, wherein the transformed primary and alternate index/key fields are utilized to locate a record within the encrypted file copy. Thus, positioning refers to locating to a specific record within the original plaintext file or the encrypted file copy. For example, to position within the encrypted file copy and locate a desired record using the transformed primary or alternate index/key field access program module 30A will supply the primary key or alternate index/key field to network file system 36A. Network file system 36A maintains an index and can utilize the primary or alternate index/key to find a matching entry in the index, locate the desired record corresponding to the entry in the index, and return as output the desired record to access program module 30A.

Access program module 30A can determine if positioning is needed based on the information being requested via the data request from application program 32B. For example, if a current data request is performed immediately after a previous data request, wherein both data requests correspond to the same record then positioning within the encrypted file copy is not needed since the correct record in the encrypted file copy is already located as a result of the previous data request. Alternatively, if a current data request is performed immediately after a previous data request, but both data requests do not correspond to the same record, then positioning is needed to locate the correct record in the encrypted file copy.

However, if the encrypted file copy is not already open (the "no" branch of decision block 305), then access program module 30A does not immediately apply field mapping to primary and alternate index/key fields. Instead access program module 30A subsequently verifies that the configuration information in a configuration file includes all properties needed for performing an open operation to open the encrypted file copy having the second format (block 310). In one embodiment, the properties include encryption keys that are needed, record fields to encrypt that are within the original plaintext file having the first format, an encryption algorithm to utilize for encrypting the record fields, and the filename of the encrypted file copy.

After verifying the configuration information, if the configuration information does not include all properties for performing the open operation then access program module 30A returns an error to application program 32B and cancels execution of the open operation, wherein further processing of the data request by access program module 30A ends. Access program module 30A cancels execution of the open operation if the configuration information does not include all the properties for performing the open operation, because access program module 30A cannot complete the open operation if the configuration information is incomplete.

However, if the configuration information includes all the properties for performing the open operation then access program module 30A opens the encrypted file copy having the second format, wherein the encrypted file copy is an encrypted version of the original plaintext file (block 315). The encrypted file copy may reside on a hard disk, and be created initially by the system programmer/administrator after the original plaintext file is configured for encryption and accessed for a first time by the system programmer/administrator. The encrypted file copy having the second format is needed because utilizing block ciphers changes the length of encrypted data fields. For example, if a plaintext data field of the original plaintext file has a length of 100 bits and the cipher block length is 128 bits, then the corresponding encrypted data field of the encrypted file copy will be 128 bits. Once the encrypted file copy is opened successfully, multiple read and write requests can be performed by application program 32B. Thus, the open operation enables application program 32B to access encrypted non-relational data utilizing block ciphers at a record field level, and in real-time without having to programmatically customize application program 32B.

Subsequently, if access program module 30A is not able to open the encrypted file copy successfully then access program module 30A returns an error to application program 32B and cancels execution, wherein further processing of the data request by access program module 30A ends. Access program module 30A cancels execution if it is not able to open the encrypted file copy successfully, because the encrypted file copy will not be available to access program module 30A to perform a read request or a write request for application program 32B.

However, if the open operation is able to open the encrypted file copy successfully then access program module 30A validates the encrypted file copy (block 320). In order to validate the encrypted file copy access program module 30A determines if attributes of the encrypted file copy, including record length and key length, match with properties provided in the configuration information of the configuration file. Typically, the record length of the encrypted file copy must be large enough to hold all primary and alternate index/key fields, all non-encrypted fields and all encrypted fields. Moreover, an additional padding may be included to comply with the cipher block length requirements of the chosen encryption algorithm, because block based encryption algorithms require that data after being encrypted is a multiple of the cipher block length.

Thus, after validating the encrypted file copy, if the record length and key length do not match with properties provided in the configuration information then access program module 30A returns an error to application program 32B and cancels execution, wherein further processing of the data request by access program module 30A ends. The execution of access program module 30A is canceled if the record length and key length do not match with properties provided in the configuration information, because the encrypted file copy will not be usable by access program module 30A to perform a read request or a write request for application program 32A and/or 32B.

However, if after validating the encrypted file copy access program module 30A determines that the record length and key length match with properties provided in the configuration information, then access program module 30A loads encryption keys into memory (i.e., RAM 16) or other suitable computer readable tangible storage devices (block 325). An encryption key is a value of some length that determines output of an encryption algorithm. Specifically, the encryption key may be utilized to perform encryption operations to transform the record fields of the original plaintext file having the first format to the record fields of the encrypted file copy having the second format, wherein the encryption key may be created by an end-user or generated by a software program. The length of the encryption key is typically measured in bits. Since the encryption key is just a value, a password or passphrase may be utilized by an end-user as the encryption key so that the encryption key is easier for the end-user to remember. Alternatively, the encryption key can even be loaded from an external key storage location. The configuration information in the configuration file indicates what type of encryption key can be utilized for performing the encryption operations and where the key can be found. The type of encryption key that can be utilized includes, but is not limited to, a public/private key pair for use with RSA encryption or similar asymmetric encryption algorithms, a secret key for use with DES, triple DES, AES, or similar symmetric encryption algorithms.

Subsequently, if all encryption keys are not loaded and available to access program module 30A then access program module 30A returns an error to application program 32B and cancels execution, wherein further processing of the data request by access program module 30A ends. The execution of access program module 30A is canceled if all encryption keys are not loaded and available to access program module 30A, because access program module 30A will not be able to perform subsequent encryption or decryption of record fields that is needed to respond to a read request or a write request sent by application program 32B.

However, if all encryption keys are loaded and available to access program module 30A then access program module 30A applies field mapping to primary and alternate index/key fields (block 330). As described above, applying field mapping to the primary and alternate index/key fields involves transforming the primary and alternate index/key fields of a record corresponding to the original plaintext file having the first format, to primary and alternate index/key fields of a record within the encrypted file copy having the second format. This transformation is governed by rules, described above in FIG. 2, that are provided in the configuration file. Access program module 30A applies field mapping to primary and alternate index/key fields so that the primary and alternate index/key fields are available to access program module 30A to locate a record in the encrypted file copy, in response to a read request or a write request sent by application program 32B.

After applying field mapping access program module 30A determines if the data request sent be application program 32B is a read request or a write request (block 335). If access program module 30A determines that the data request from application program 32B is a read request (the "yes" branch of decision block 340) then access program module 30A executes a read request operation and decrypts data (block 345). However, if access program module 30A determines that the data request from application program 32B is not a read request (the "no" branch of decision block 340) then access program module 30A executes a write request operation and encrypts data (block 350).

Specifically, in the scenario where the data request is a read request, access program module 30A performs the read request operation to allow application program 32B to read record content (i.e., data) at the record field level from the encrypted file copy, wherein application program 32B provides access program module 30A a primary or alternate index/key of the desired record to be read. In order to be able to read record content from the desired record, the primary or alternate index/key may be utilized, if needed, to locate the desired record. Once the desired record is located within the encrypted file copy, then record contents (i.e., encrypted non-relational data) from data fields within the record are read into memory, for example RAM 16 of computer 10, and are decrypted. Access program module 30A knows the record fields that need to be decrypted when performing the read request operation, because the names and locations of record fields that are encrypted can be listed in the configuration file and available to access program module 30A as part of the configuration information. In addition to data fields, other record fields within the record may be read into memory. To decrypt the record contents from the data fields, access program module 30A utilizes at least one of the encryption keys that were loaded into memory (i.e., RAM 16) or other suitable computer readable tangible storage devices, to transform the record content from encrypted non-relational data back into unencrypted non-relational as expected by application program 32B. In addition, the data fields and the other record fields that were read into memory can be mapped into a record having the first format, so that application program 32B can understand and utilize the record. Subsequently, the unencrypted data fields and/or the other record fields may be transmitted to application program 32B to complete the read request operation successfully, wherein further processing of the data request by access program module 30A ends.

If the read request operation is not successful then access program module 30A returns an error to application program 32B and cancels execution, wherein further processing of the data request by access program module 30A ends. However, while the encrypted file copy is open subsequent read requests or write requests can be performed by application program 32A and/or 32B.

In the scenario where the data request is a write request, access program module 30A performs the write request operation to allow application program 32B to write record content (i.e., data) at the record field level to the encrypted file copy, wherein application program 32B provides access program module 30A a primary or alternate index/key of a desired record to be written into. The primary or alternate index/key may be utilized, if needed, to position to a location within the encrypted file copy and write record content to the desired record. Once positioned to the appropriate location, access program module 30A encrypts part of the record content from an original record passed by application program 32B utilizing one of the encryption keys that was loaded into memory, wherein the part of the record content is designated for encryption in the configuration file that was created by the system programmer/administrator. Access program module 30A may encrypt only part of the record content from the record passed by application program 32B, because only part of the record content was configured for encryption by the system programmer/administrator. Next access program module 30A, utilizing the configuration information, performs the write request operation against the encrypted file copy, wherein record content is written into a desired record field of the encrypted file copy and further processing of the data request by access program module 30A ends.

If the write request operation is not successful then access program module 30A returns an error to application program 32B and cancels execution of the write request operation, wherein further processing of the data request by access program module 30A ends. However, while the encrypted file copy is open subsequent read requests or write requests can be performed by application program 32A and/or 32B.

The flowchart illustrated in FIG. 3 has been described above in context of application program 32B sending a data request for non-relational data stored on computer 10, wherein access program module 30A handles the data request via network file system 36A. However, the flowchart also applies to an alternative embodiment, wherein a data request for non-relational data stored on computer 10 is sent by application program 32A and access program module 30A handles the data request via local file system 34. Moreover, the flowchart also applies to still another alternative embodiment, wherein a data request for non-relational data stored on network file system server 50 is sent by application program 32A or 32B and access program module 30B handles the data request via network file system 36B.

The foregoing description of various aspects of the invention has been presented for purposes of illustration and description. It is not intended to be exhaustive or to limit the invention to the precise form disclosed and, obviously, many modifications and variations that may be apparent to a person skilled in the art are intended to be included within the scope of the invention as defined by the accompanying claims.

What is claimed is:

1. A method for encrypted file access comprising:
an access program module, connected to at least one file system, intercepting a data request for accessing a plaintext file with information stored physically and consecutively on a hard disk and having a pre-determined order and length expected by a program that sends the data request, wherein the plaintext file includes a plaintext record having a key field and a plaintext data field;
the access program module determining an encrypted file, associated with the plaintext file, based on a configuration file and the data request, wherein the configuration file indicates the encrypted file associated with the plaintext file and the encrypted file includes an encrypted record associated with the plaintext record, and wherein the encrypted record includes a header field, the key field, and an encrypted data field that is associated with the plaintext data field;
the access program module determining one or more encryption keys based on the configuration file; and
the access program module accessing the encrypted data field based on the one or more encryption keys and the key field, wherein accessing the encrypted data field based on the one or more encryption keys and the key field comprises:

utilizing the key field to locate the encrypted record within the encrypted file, utilizing block ciphers and the one or more encryption keys to decrypt the encrypted data field of the encrypted record, transforming the key field and the encrypted data field into a format of the plaintext file expected by the program, and subsequently returning an unencrypted version of the information based on the data request.

2. The method of claim 1, wherein the access program module determining the encrypted file, associated with the plaintext file further comprises:
generating the configuration file having configuration information that includes a list containing the plaintext file that is configured for encryption, a format of the plaintext file, the one or more encryption keys that are needed to perform encryption and decryption operations on the encrypted data field, the plaintext data field within the plaintext file to encrypt, an encryption algorithm for the access program module to utilize for transforming the plaintext data field to the encrypted data field, and rules that require a sequential ordering of fields within the encrypted record of the encrypted file.

3. The method of claim 2, wherein the format of the plaintext file included in the configuration information is generated by the access program module parsing source code of the program.

4. The method of claim 2, wherein the sequential ordering is such that the encrypted record begins with the header field, followed by the key field, and followed by the encrypted data field.

5. The method of claim 4, wherein the encrypted data field is followed by a pad field, and a length of the encrypted data field combined with a length of the pad field is a multiple of a cipher block length.

6. The method of claim 1, wherein the at least one file system comprises a local file system, a network file system, or both the local file system and the network file system.

7. The method of claim 1, wherein the program installed on a first computer sends the data request to the at least one file system of the first computer, or the program installed on the first computer sends the data request over a network to the at least one file system of a second computer.

8. The method of claim 1, wherein:
the access program module, connected to the at least one file system, intercepting the data request comprises the at least one file system calling the access program module in response to the at least one file system receiving the data request from the program and an occurrence of a predetermined condition; and
the predetermined condition comprises the at least one file system receiving the data request in which the data request is an open request, a close request, a read request, or a write request.

9. The method of claim 1, wherein the access program module accessing the encrypted data field based on the one or more encryption keys and the key field further comprises:
utilizing the key field to locate the record within the encrypted file, utilizing block ciphers and the one or more encryption keys to encrypt the plaintext data field, and subsequently transforming the plaintext data field into a format of the encrypted file determined by the access program module, and subsequently writing, into the encrypted data field, an encrypted version of information stored physically and consecutively on a hard disk and having a pre-determined order and length expected by the program that sends the data request.

* * * * *